US005676399A

United States Patent [19]

Hollerbach

[11] Patent Number: 5,676,399

[45] Date of Patent: Oct. 14, 1997

[54] SPORTS TEAM FOLDER

[76] Inventor: Thomas J. Hollerbach, 10 Laurel Dr., Long Valley, N.J. 07853

[21] Appl. No.: 617,547

[22] Filed: Mar. 19, 1996

[51] Int. Cl.$^{6}$ ..................................................... G09B 1/00

[52] U.S. Cl. ................................. 281/31; 283/49; 40/537

[58] Field of Search ................................ 283/49; 281/31; 40/359, 654.01, 537; 434/247, 251, 248, 108; 229/67.2, 67.1, 72; D19/26, 27, 33

[56] References Cited

U.S. PATENT DOCUMENTS

| | | | |
|---|---|---|---|
| 3,560,092 | 2/1971 | Coney | 434/251 |
| 3,685,170 | 8/1972 | Fairleigh | 434/248 |
| 4,419,837 | 12/1983 | Meeker | 40/359 |
| 4,676,527 | 6/1987 | Palmer | 281/31 |
| 4,919,618 | 4/1990 | Andersen | 434/251 |
| 5,096,752 | 3/1992 | Wagner | 40/654.01 |
| 5,163,845 | 11/1992 | Blassingame | 434/248 |
| 5,323,553 | 6/1994 | Cadido | 40/537 |

*Primary Examiner*—Daniel W. Howell
*Assistant Examiner*—Gregory Andoll

[57] ABSTRACT

A sports team folder for organizing players of a team according to the positions being played. The inventive device includes a front cover and a rear cover pivotally coupled together. A plurality of storage pockets are coupled to a first one of the covers and removably hold a plurality of player cards. A plurality of position pockets and bench pockets are secured to another one of the covers and can each receive an individual one of the player cards. The position pockets are each labeled for a corresponding position on a sports team such that a player card for a particular player can be positioned into a corresponding position pocket before or during play of a game to assist a coach in tracking players of the team.

12 Claims, 3 Drawing Sheets

SPORTS TEAM FOLDER

BACKGROUND OF THE INVENTION

1. Field of the Invention

The present invention relates to sporting devices and more particularly pertains to a sports team folder for organizing players of a team according to the positions being played.

2. Description of the Prior Art

The use of sporting devices is known in the prior art. More specifically, sporting devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art sporting devices include U.S. Pat. No. 4,047,308; U.S. Pat. No. 3,593,432; U.S. Design Patent 333,846; U.S. Pat. No. 5,289,926; U.S. Pat. No. 3,489,411; and U.S. Pat. No. 5,067,730.

While these devices fulfill their respective, particular objectives and requirements, the aforementioned patents do not disclose a sports team folder for organizing players of a team according to the positions being played which includes a front cover and a rear cover pivotally coupled together, a plurality of storage pockets coupled to one of the covers, a plurality of player cards removably positioned within the storage pockets, a plurality of position pockets and bench pockets secured to the one of the covers, wherein the position pockets are each labeled for a corresponding position on a sports team such that a player card for a particular player can be positioned into a corresponding position pocket before or during play of a game to assist a coach in tracking players of the team.

In these respects, the sports team folder according to the present invention substantially departs from the conventional concepts and designs of the prior art, and in so doing provides an apparatus primarily developed for the purpose of organizing players of a team according to the positions being played.

SUMMARY OF THE INVENTION

In view of the foregoing disadvantages inherent in the known types of sporting devices now present in the prior art, the present invention provides a new sports team folder construction wherein the same can be utilized for organizing players of a team according to the positions being played. As such, the general purpose of the present invention, which will be described subsequently in greater detail, is to provide a new sports team folder apparatus and method which has many of the advantages of the sporting devices mentioned heretofore and many novel features that result in a sports team folder which is not anticipated, rendered obvious, suggested, or even implied by any of the prior art sporting devices, either alone or in any combination thereof.

To attain this, the present invention generally comprises a sports team folder for organizing players of a team according to the positions being played. The inventive device includes a front cover and a rear cover pivotally coupled together. A plurality of storage pockets are coupled to a first one of the covers and removably hold a plurality of player cards. A plurality of position pockets and bench pockets are secured to another one of the covers and can each receive an individual one of the player cards. The position pockets are each labeled for a corresponding position on a sports team such that a player card for a particular player can be positioned into a corresponding position pocket before or during play of a game to assist a coach in tracking players of the team.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new sports team folder apparatus and method which has many of the advantages of the sporting devices mentioned heretofore and many novel features that result in a sports team folder which is not anticipated, rendered obvious, suggested, or even implied by any of the prior art sporting devices, either alone or in any combination thereof.

It is another object of the present invention to provide a new sports team folder which may be easily and efficiently manufactured and marketed.

It is a further object of the present invention to provide a new sports team folder which is of a durable and reliable construction.

An even further object of the present invention is to provide a new sports team folder which is susceptible of a low cost of manufacture with regard to both materials and labor, and which accordingly is then susceptible of low prices of sale to the consuming public, thereby making such sports team folders economically available to the buying public.

Still yet another object of the present invention is to provide a new sports team folder which provides in the apparatuses and methods of the prior art some of the advantages thereof, while simultaneously overcoming some of the disadvantages normally associated therewith.

Still another object of the present invention is to provide a new sports team folder for organizing players of a team according to the positions being played.

Yet another object of the present invention is to provide a new sports team folder which includes a front cover and a rear cover pivotally coupled together, a plurality of storage pockets coupled to one of the covers, a plurality of player cards removably positioned within the storage pockets, a plurality of position pockets and bench pockets secured to one of the covers, wherein the position pockets are each labeled for a corresponding position on a sports team such that a player card for a particular player can be positioned into a corresponding position pocket before or during play of a game to assist a coach in tracking players of the team.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
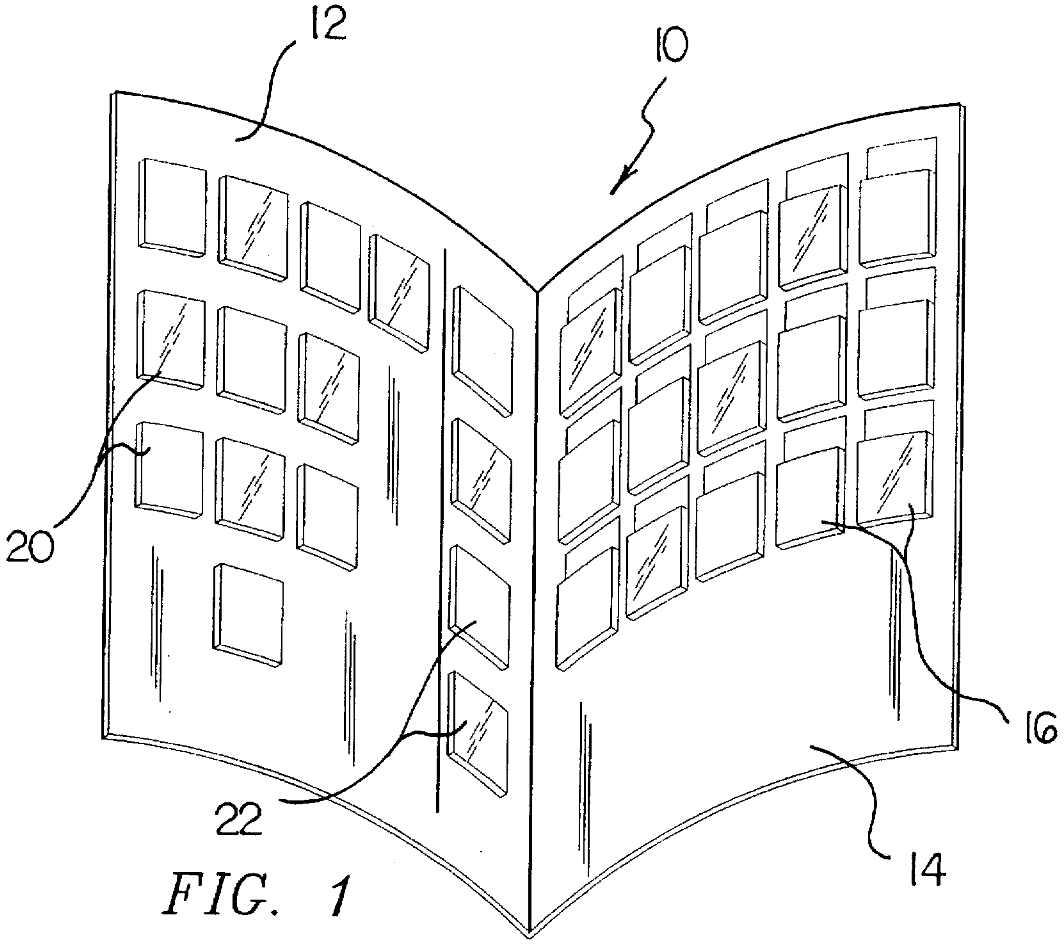
FIG. 1 is a perspective illustration of the preferred embodiment of the sports team folder constructed in accordance with the principles of the present invention.

With reference now to the drawings, and in particular to FIGS. 1–7 thereof, a new sports team folder embodying the principles and concepts of the present invention and generally designated by the reference numeral 10 will be described.

Figure 2:
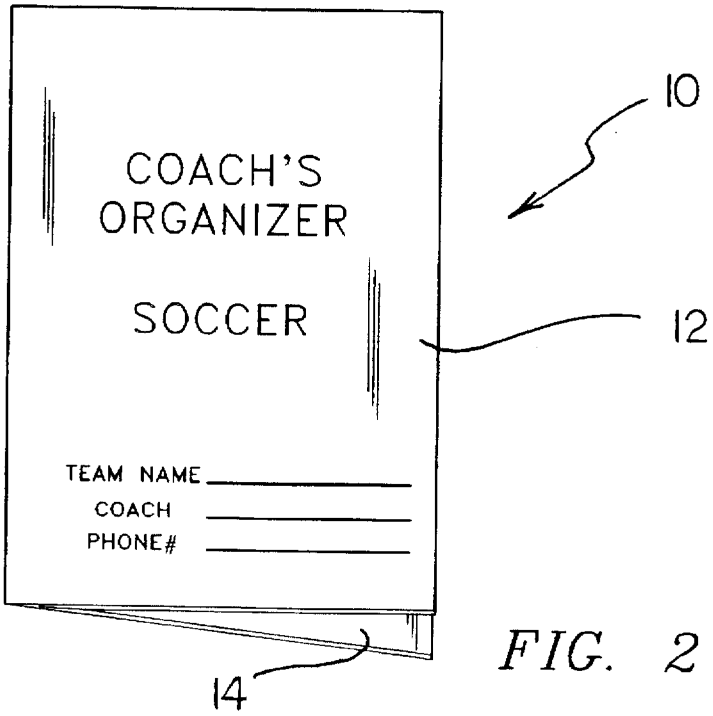
FIG. 2 is a front elevational view of the present invention.
Figure 3:
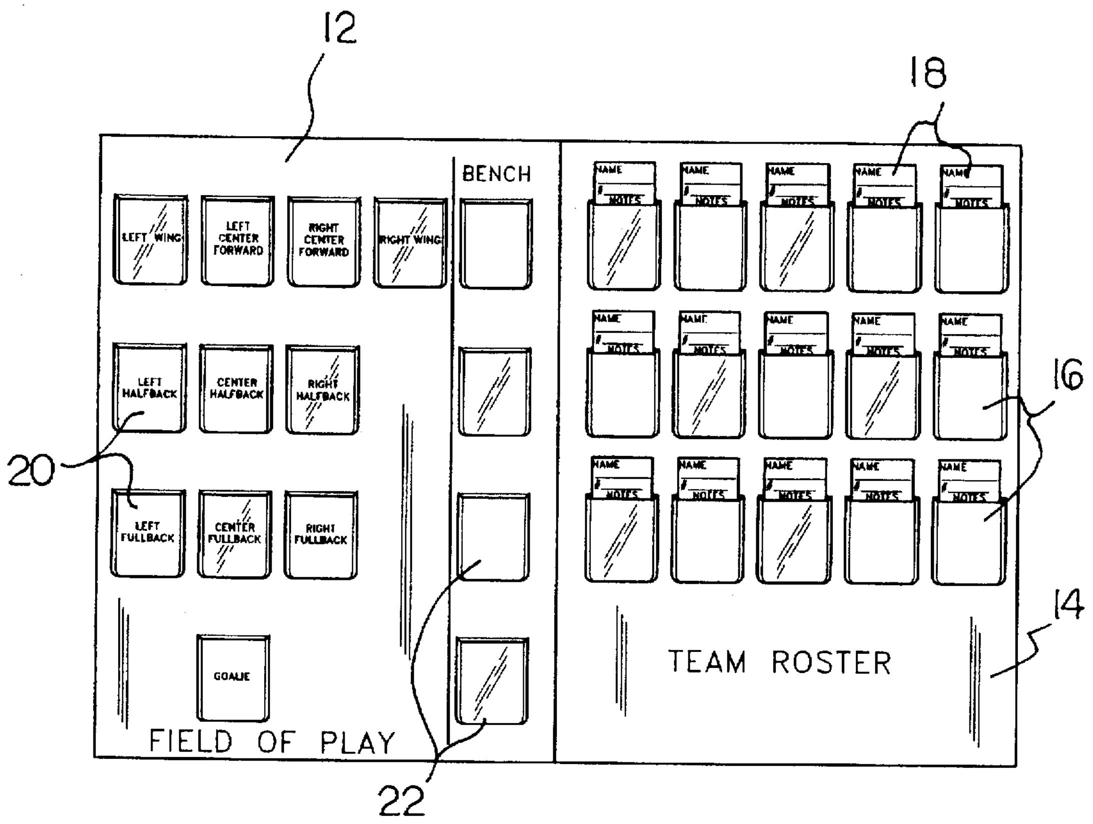
FIG. 3 is a front elevational view of the invention in an open configuration.

More specifically, it will be noted that the sports team folder 10 comprises a front cover 12 pivotally coupled to a rear cover 14 such that the folder 10 can be opened or closed as shown in FIGS. 1 through 3. A plurality of storage pockets 16 are secured to one of the covers 12 or 14 and operate to receive and support a plurality of player cards 18. A plurality of position pockets 20 and a plurality of bench pockets 22 are secured to another one of the covers 12 or 14. By this structure, each of the player cards can be individually labeled to a player of a sports team and positioned into a desired one of the position pockets 20 or bench pockets 22 to assist a coach in tracking players of the team.

Figure 4:
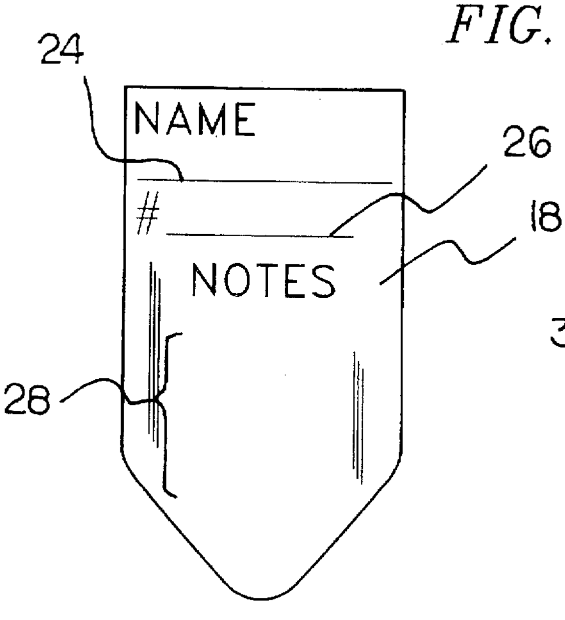
FIG. 4 is a front elevational view of a player card of the invention.
Figure 5:
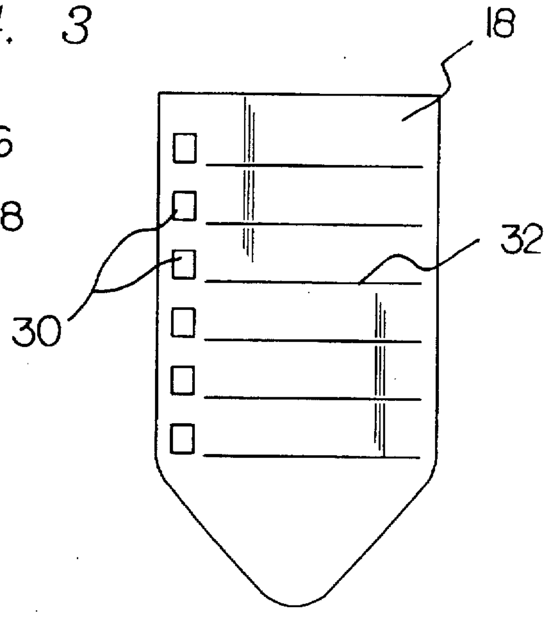
FIG. 5 is a rear elevational view of a player card of the invention.

Referring to FIGS. 4 and 5, it can be shown that each of the player cards 18 includes a blank name line 24 printed thereon within which the name of a player may be printed or written. Beneath the blank name line 24 may be a blank number line 26 within which the number of the player can be written. A blank note area 28 is positioned below the blank number line 26 to allow a coach to write in various notes about the particular player. On the reverse side of the card 18, there are a plurality of check boxes 30 next to which is a blank position line 32 within which the player positions can be printed or written such that a coach can check off one of the check boxes adjacent to a position line 32 to indicate a position at which the player is particularly adept at performing. Alternatively, the position lines may be preprinted with the positions of a particular sporting team if so desired. However, it is preferable that the position lines be blank such that the invention 10 can be customized to a particular sport as desired by an end user.

Figure 6:
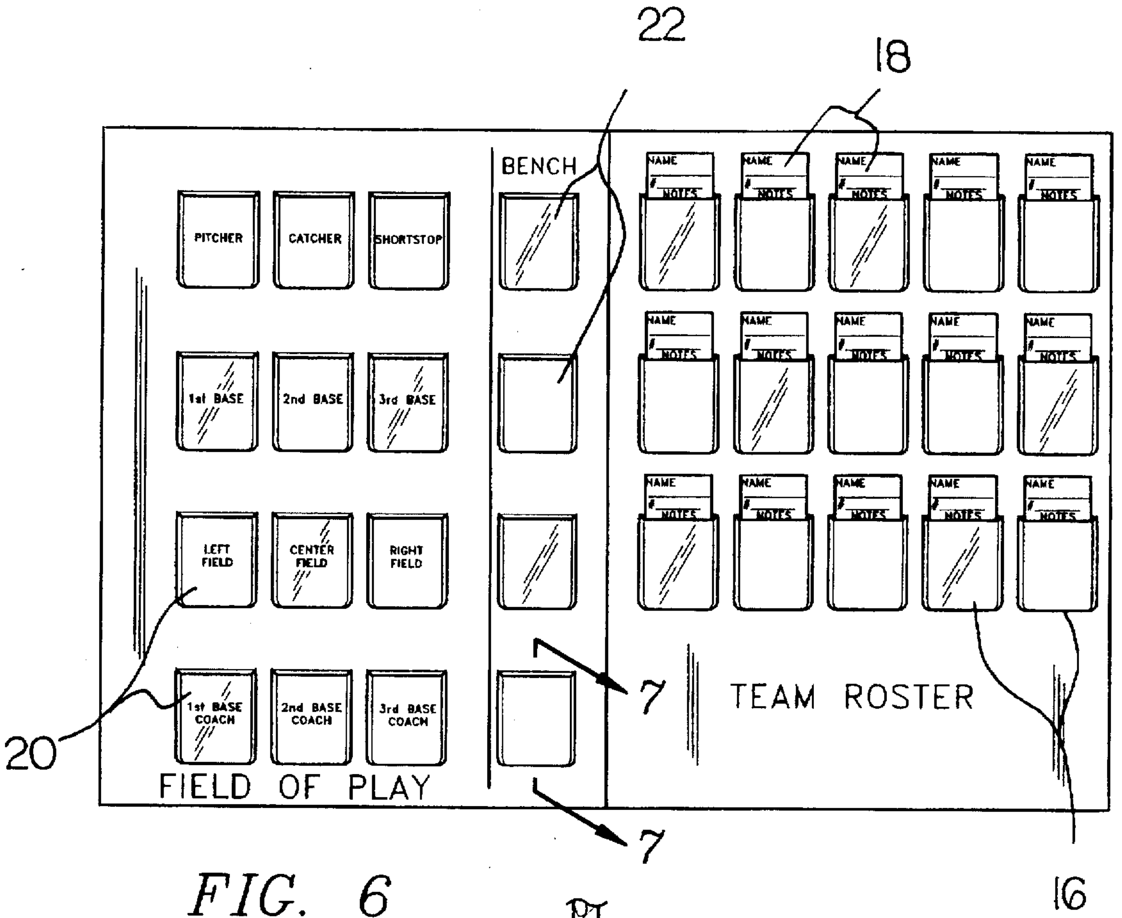
FIG. 6 is a front elevational view of an alternative form of the invention in an open configuration.

As shown in FIG. 3, the invention 10 may be configured for use by a soccer team wherein the position pockets 20 are labeled "left wing", "left center forward", "center halfback", etc. As shown in FIG. 6, the invention 10 may alternatively be configured for use by a baseball team wherein the position pockets 20 are labeled "pitcher", "catcher", "left field", and so on. Preferably, the pockets 20 and 22, as well as the position lines 32 of the player cards 18 are provided without markings thereon so as to allow an end user to customize the invention to a particular sport.

Figure 7:
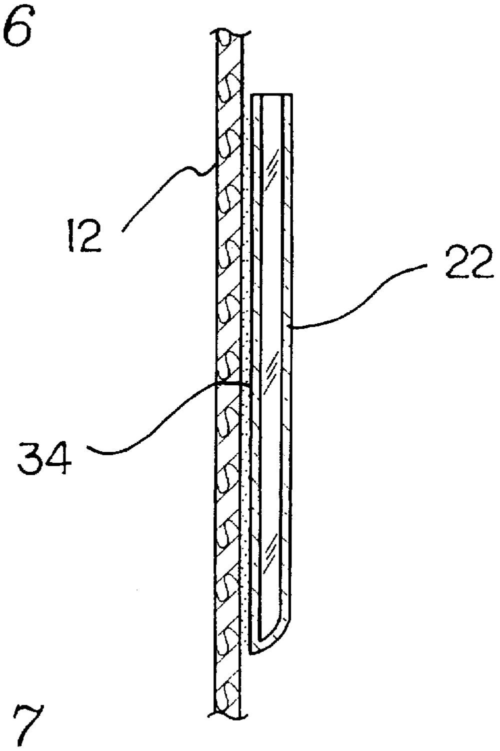
FIG. 7 is a cross sectional view taken along line 7—7 of FIG. 6.

As shown in FIG. 7 for one of the bench pockets 22, the pockets 16, 20, and 22 can be secured to the covers 12 or 14 by an adhesive 34 interposed therebetween.

In use, the sports team folder 10 of the present invention 10 can be easily utilized for organizing players of a team according to the positions being played. To this end, a method of use of the invention 10 includes labeling the player cards with the name of individual players of a sports team by writing a name of the player on the blank name line 24. The position pockets 20 are then labeled with the positions of a sports team for a particular sport. In accordance with assigned positions on the sports team, the player cards 18 are each positioned into an individual one of the position pockets 20. Additional player cards 18 can be positioned into the bench pockets 22.

If desired, an assigned number of the player can be written into the blank number line of a respective one of the player cards 18. The blank position lines 32 can be labeled with the positions of the sports team, and a check mark can be written into one of the check boxes to label a respective one of the players as being particularly good at playing that position.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A sports team folder comprising:

a front cover;

a rear cover pivotally coupled to the front cover;

a plurality of storage pockets secured to either one of the covers;

a plurality of player cards removably positioned within the storage pockets;

a plurality of position pockets secured to either one of the covers, wherein each of the player cards can be individually labeled with a name of a player of a sports team, the position pockets can be individually labeled to the positions of a sports game, and the player cards each can be positioned into a respective one of the position pockets to assist a coach in tracking players of the team.

2. The sports team folder of claim 1, wherein each of the player cards includes a blank name line printed thereon within which the name of the player can be written.

3. The sports team folder of claim 2, wherein each of the player cards includes a blank number line within which a number of the player can be written, and a blank note area positioned below the blank number line to allow a user to write in various notes about the particular player.

4. The sports team folder of claim 3, wherein a reverse side of the card includes a plurality of check boxes, and plurality of blank position lines each aligned with an individual one of the check boxes.

5. The sports team folder of claim 4, and further comprising a plurality of bench pockets secured to either one of the covers.

6. A sports team folder comprising:

at least one cover;

a plurality of player cards;

a plurality of position pockets secured to the cover, wherein each of the player cards can be individually labeled with a name of a player of a sports team, the position pockets can be individually labeled to the positions of a sports game, and the player cards each can be positioned into a respective one of the position pockets to assist a coach in tracking players of the team.

7. The sports team folder of claim 6, wherein each of the player cards includes a blank name line printed thereon within which the name of the player can be written.

8. The sports team folder of claim 7, wherein each of the player cards includes a blank number line within which a number of the player can be written, and a blank note area positioned below the blank number line to allow a user to write in various notes about the particular player.

9. The sports team folder of claim 8, wherein a reverse side of the card includes a plurality of check boxes, and plurality of blank position lines each aligned with an individual one of the check boxes.

10. The sports team folder of claim 9, and further comprising a plurality of bench pockets secured to either one of the covers.

11. A method of organizing a sports team comprising the steps of:

providing a sports team folder comprising at least one cover; a plurality of player cards; and a plurality of position pockets secured to the cover;

individually labeling each of the player cards with a name of a player of a sports team;

individually labeling the position pockets to the positions of a sports game;

positioning each of the player cards into an individual one of the position pockets corresponding to a respective position being played in the sports game by the player named on the player card.

12. The method of organizing a sports team of claim 11, and further comprising the steps of:

providing blank position lines on each of the player cards;

labeling the blank position lines with the positions of the sports game;

placing a mark next to the blank position line labeled with one of the positions.

* * * * *